July 27, 1954  O. C. SEVERSON  2,684,520
MILLING CUTTER BLADE WITH DUAL ADJUSTMENT
Filed Dec. 30, 1950
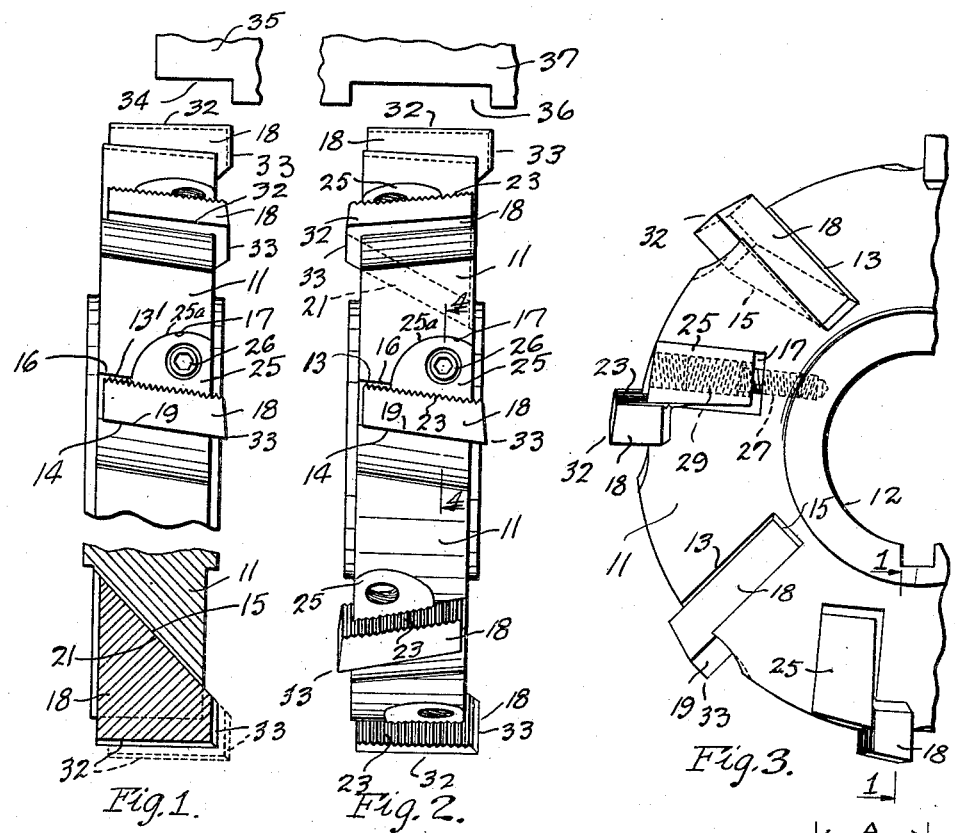
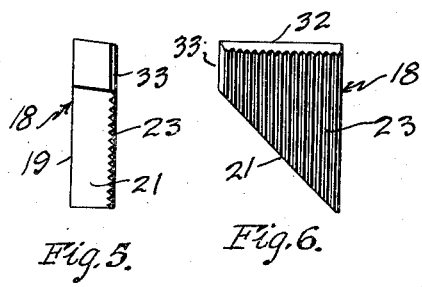
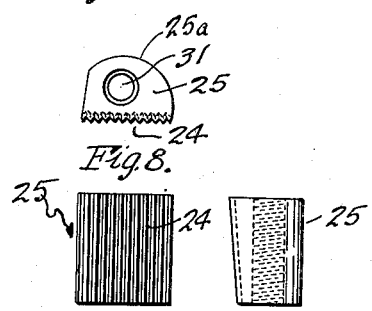
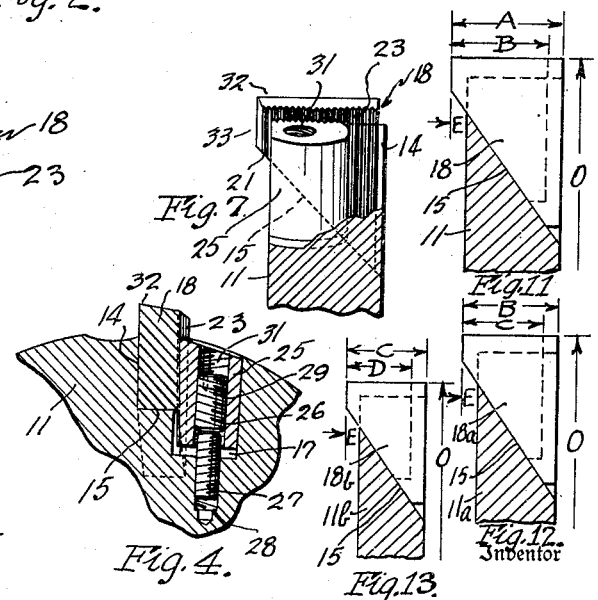
Inventor
Ole C. Severson
By Wooster & Davis Attorneys Patented July 27, 1954

2,684,520

UNITED STATES PATENT OFFICE 2,684,520

MILLING CUTTER BLADE WITH DUAL ADJUSTMENT

Ole C. Severson, Derby, Conn., assignor to The Viking Tool Company, Shelton, Conn., a corporation of Connecticut Application December 30, 1950, Serial No. 203,686

5 Claims. (Cl. 29—105)

1

This invention relates in general to inserted tooth cutting tools, and an object is to provide an improved cutting tool of this type constructed and arranged to provide a better and more efficient use of the relatively expensive cutter blades than has heretofore been the case.

More particularly, the invention relates to rotary cutters such, for example, as staggered tooth slotting cutters, or half side milling cutters, or the like, in which cutter blades are employed having a cutting profile formed on each blade by axial and radial cutting edges. A further object is to provide an improved rotary cutter of this type so constructed that the original profile of the cutting blades can be easily maintained by a simple and easy adjustment of the individual blades.

A further object is to provide an improved cutter construction such that as the blades are reduced in size by successive grindings they can be reused repeatedly in progressively smaller cutters, thus allowing substantially complete use of the expensive cutting material and resulting in important savings to users.

A further object is to provide a cutting tool of the above type having a clamping mechanism of improved construction and arrangement which contributes directly to the advantageous results of this invention.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a front elevation of a half side milling cutter constructed in accordance with one embodiment of the invention, partly in section on the line 1—1 of Fig. 3;

Fig. 2 is a front elevation of a staggered tooth slotting cutter showing one embodiment of the invention applied to a cutter of this type;

Fig. 3 is a partial side elevation on an enlarged scale of the slotting cutter shown in Fig. 2;

Fig. 4 is a partial section on the line 4—4 of Fig. 2;

Figs. 5 and 6 are side and front elevations, respectively, of a cutting blade employed in the present invention;

Fig. 7 is a part section, part elevation, showing a detail of the blade clamping means;

Figs. 8, 9 and 10 are top, front and side elevations respectively, of the clamping wedge member shown in Figs. 1, 2 and 7, and Figs. 11, 12 and 13 are detail sections of a portion of rotary cutters showing somewhat diagrammatically how the cutter blades can be used in progressively smaller cutters but maintain the original profile.

As illustrated in the drawing, the invention is shown in the form of a rotary cutter having a body portion 11 provided with an axial opening 12 for mounting on an arbor (not shown). Figs. 2 and 3 illustrate a staggered tooth slotting cutter which is formed with peripheral slots 13 alternately inclined in opposite directions relatively to the axis of the cutter body 11. Fig. 1 illustrates a half side milling cutter having peripheral slots 13' which are all inclined in the same direction relatively to the cutter axis.

Each slot 13 or 13' has a planar front wall 14, an inclined bottom wall 15 and a rear wall 16 formed with a recess 17 at one end of the slot 13 or 13' (see Figs. 1 and 2).

A cutter blade 18 is mounted in each slot 13, 13' and each blade has a planar front face 19 engaging the front wall 14 of the associated slot 13, 13', and an inclined lower edge 21 slidably engaging the inclined bottom wall 15 of the slot, permitting individual adjustment of each blade 18 in its associated slot in the manner hereafter described. A rear face on each blade 18 has radial ribs and grooves 23 adapted to be engaged by corresponding and cooperating radial ribs and grooves 24 on the front face of a clamping wedge or tapered member 25 rounded on its rear face 25a fitting in the associated recess 17 at one end of the slot 13, 13'. A threaded clamping bolt 26 having right and left hand threads at its opposite ends, respectively, has one end 27 threaded into an opening 28 in the cutter body portion at the bottom of the recess 17, and the other end 29 threaded through an opening 31 extending through the associated wedge member 25, whereby to quickly operate the wedge 25 to clamp or release the associated cutter blade 18.

Each cutter blade 18 has a cutting profile formed by an axial cutting edge 32 and a radial cutting edge 33 intersecting the axial edge at one corner of the blade. In the case of a half side milling cutter as shown in Fig. 1, the blades or bits are alike and are mounted in the similarly inclined peripheral slots 13' to cut a notch 34, or the like, in a work piece 35, for example, shown at the top of Fig. 1. In the case of a slotting cutter such, for example, as that illustrated in Fig. 2, the alternate blade slots 13 are oppositely inclined and successive cutter blades have their radial cutting edges 33 on opposite sides of the body portion 11 to cut a slot 36, or the like, in a work piece 37, for example, shown at the top of Fig. 2.

With this arrangement it is possible and easy to maintain the original profile of the cutter even after repeated grinding of the cutting edges 32, 33 causes a substantial reduction in the original size of the cutter blade. This is accomplished, after loosening the wedge members 25, by adjusting each blade after grinding by shifting it along the inclined bottom wall 15 of the recess 13, 13' the distance of one or more ribs 23, 24 to locate each edge in its original position providing the original profile. Even when a blade has been ground to such an extent as to become too small for a given cutter, it can then be used in a cutter of smaller size, and this can be repeated with several progressively smaller cutters until the blade is substantially used up, as shown in Figs. 11, 12 and 13. This greatly reduces the cost of operation and results in important savings to the user. Thus, in Fig. 11, A represents the original width of the cutter blade 18, and B represents minimum cutter blade width practical for the body 11 of the width or thickness shown in Fig. 11. The dual adjustment maintains the original cutter diameter O and face overhang E. In Fig. 12, the blade with width B is shown stepped down to narrower cutter body 11a. The width C represents the minimum blade width practical for the body 11a. As above, the dual adjustment maintains the original cutter diameter O and profile, as well as face overhang E. Fig. 12 shows the blade stepped down to a still narrower cutter body 11b, with D representing the minimum width of blade practical for use with this body. The dual adjustment still maintains the original cutter diameter O, profile and face overhang E. This stepping down can be continued until the blade is substantially used up or is too small for further use. This is called "the step down method" and permits more complete use of expensive cutting material. With a slotting cutter such as that of Fig. 2, the adjustment of alternate blades is in opposite axial directions to maintain the width of the slot 35 despite repeated grindings of the blades. When the inclined bottom wall 15 and the cooperating edge 21 of the cutter are each at an angle of 45° to the axis, the adjustment of the blade along such bottom wall will increase the diameter of the cutter to the same extent as the width. By forming the cutter and the blades with the wall 15 and the edge 21 at an angle greater than 45°, adjustment will increase the diameter to a greater degree than the width. For example, when the adjusting surfaces 15, 21 are at an angle of about 55° the relative adjustment of the diameter to the width will be about 3 to 2. On the other hand, forming the surfaces 15, 21 at an angle less than 45° will increase the width to a greater degree than the diameter for a given adjustment of the blade. The particular adjustment will depend on the particular type of work to be done, the materials used, and so forth, and depend on whether the greater wear occurs on the radial or axial cutting edges.

During cutting the blades are held securely in the slots 13, 13' by the wedging member 25 which is drawn downwardly into the recess 17 by the threaded fastening bolt 26. For adjustment, the bolt is loosened and the blade 18 shifted along the inclined wall 15, usually the distance of one rib and groove 23, and the wedge 25 then clamped by the bolt 26. Each cutter blade 18 is preferably of such width and the wedge is of greater thickness than the depth of the recess so that the rear face of the blade provided with the ribs and grooves 23 is slightly spaced from the rear wall 16 of the associated slot 13, 13' when clamped in operative position by the wedge member 25, as shown in Figs. 1 and 2. This provides clearance to permit the blade to have limited rocking movement transversely so that its front flat or plane surface 19 seats firmly and uniformly throughout on the front plane wall surface 14 of the slot and the blade is firmly clamped against this surface. It also permits the front surface 24 of the wedge to seat squarely and firmly against the rear surface of the blade. This rocking movement is secured by turning movement of the curved rear surface 25a of the wedge in the correspondingly curved recess 17 in the rear wall of the slot.

By positioning the blade clamping wedge 25 at the back of the associated blade 18, it can be arranged to engage the blade over an area closely adjacent the cutting edges where the cutting stresses are greatest and thus provide support at exactly the point where it is most needed. The wedge 25 can be formed of harder material than the body 11, such, for example, as tool steel, a carbide or other suitable material, and is not likely to be damaged as a result of breakage of the blade 18. Even if the wedge 25 should be damaged by blade breakage, only a single wedge would have to be replaced, and not the entire cutter body 11, as has heretofore frequently been the case when the blade is backed up directly by the rear wall of the blade slot.

It will be understood from the above that because of the inclined wall at the bottom of the blade slot and the inclined bottom edge of the blade, there is simultaneous adjustment of the outer or peripheral cutting edge 32 of the blade and the side face cutting edge 33, thus maintaining both the width and diameter of the cutter, as the blades or bits are adjusted. That is, by this dual adjustment the width and diameter of the cutter is increased and then the blades can be ground to original size for the cutter by grinding the edges 32 and 33.

Also because of the profile 32, 33 on the blade (these are the wear surfaces which are reground) the general profile of the blade is maintained for successive grindings, and so after the blade becomes too small for the first cutter body it can be used in a smaller cutter body, and this can be done several times with progressively smaller cutters. This is called "the step down method" and allows more complete use of expensive cutting material, with important savings to the user.

By locating the locking or clamping device 25 behind the cutting blade it locks the blade up close to where application of pressure due to the cutting operations is. It is possible to use harder surface or material in the locking member than in the body 11 of the cutter or holder, so there is less liability of damage should a blade break, and if the locking element is damaged it can be readily replaced. This is a material advantage over an arrangement where the blade locking element is in front of the blade and the blade rests at its back against the body of the holder. In this case breaking of the blade is likely to damage the body of the cutter or holder, and the whole holder body must be replaced or it must be repaired.

Having thus set forth the nature of my invention, I claim:

1. A cutting tool comprising a body portion having a cutter-receiving slot formed with a front wall to engage the front face of a cutter blade, an inclined bottom wall to engage the lower edge of a cutter blade, and a rear wall formed with a transversely curved recess, a cutter blade having lateral and end cutting edges, a front face engaging the front wall of said slot, and an inclined lower edge engaging said bottom wall to support said blade with said cutting edges in determinate position, whereby relative movement of said blade along said inclined bottom wall simultaneously adjusts the positions of both said cutting edges, means clamping said blade in said slot with the front face of the blade engaging said front wall, whereby to protect said body portion against damage caused by breaking of said blade in use, comprising a wedge member in said recess at the rear side of the blade and having a flat front face engaging the rear face of said cutter blade, said wedge member being of a thickness greater than the depth of the recess to space the blade forwardly of the rear face of the slot and provided with a rear transversely curved surface seated in the recess for limited rocking movement of the wedge therein and limited rocking movement of the blade in the slot, and means securing said wedge in said recess in clamping engagement with the blade in the slot to clamp this blade against the front wall of the slot.

2. A cutting tool comprising a rotary body portion having a cutter slot formed in the periphery thereof with a front wall to engage the front face of a cutter blade, an inclined bottom wall to engage the lower edge of a cutter blade, and a rear wall formed with a transversely curved recess, a cutter blade having axial and radial cutting edges, a front face engaging the front wall of said slot, a rear face spaced from the rear wall of said slot, and an inclined lower edge engaging said bottom wall to support said blade with said cutting edges in determinate position, whereby relative movement of said blade along said inclined bottom wall simultaneously adjusts the positions of both said cutting edges, means clamping said blade in said slot with the front face of the blade engaging said front wall, whereby to protect said body portion against damage caused by breaking of said blade in use, comprising a wedge member in said recess at the rear side of the blade and having a flat front face engaging the rear face of said cutter blade, said wedge member being of a thickness greater than the depth of the recess to space the blade forwardly of the rear face of the slot and provided with a rear transversely curved surface seated in the recess for limited rocking movement of the wedge therein and limited rocking movement of the blade in the slot, and means securing said wedge in said recess in clamping engagement with the blade in the slot to clamp this blade against the front wall of the slot.

3. A slotting cutter comprising a rotary body portion having a plurality of cutter slots formed in the periphery thereof, each having a front wall to engage the front face of a cutter blade, an inclined bottom wall to engage the lower edge of a cutter blade, and a rear wall formed with a transversely curved recess, the said bottom walls of successive slots being alternately inclined in opposite directions, a cutter blade having axial and radial cutting edges and having a front face engaging the front wall of said slot, an inclined lower edge engaging said bottom wall to support said blade with said cutting edges in determinate position, the said lower edges of successive blades being alternately inclined in opposite directions to engage said bottom walls, whereby relative movement of each blade along the associated inclined bottom wall simultaneously adjusts the positions of said cutting edges to permit maintaining the original cutter profile after grinding said cutting edges, and means clamping each blade in the associated slot comprising a wedge member in said recess at the rear side of the blade and having a flat front face engaging the rear face of said cutter blade, said wedge member being of a thickness greater than the depth of the recess to space the blade forwardly of the rear face of the slot and provided with a rear transversely curved surface seated in the recess for limited rocking movement of the wedge therein and limited rocking movement of the blade in the slot, and means securing said wedge in said recess in clamping engagement with the blade in the slot to clamp this blade against the front wall of the slot.

4. A slotting cutter comprising a rotary body portion having a plurality of cutter slots formed in the periphery thereof, each having a front wall to engage the front face of a cutter blade, an inclined bottom wall to engage the lower edge of a cutter blade, and a rear wall formed with a transversely curved recess, the said bottom walls of successive slots being alternately inclined in opposite directions, a cutter blade having axial and radial cutting edges and having a front face engaging the front wall of said slot, an inclined lower edge engaging said bottom wall to support said blade with said cutting edges in determinate position, the said lower edges of successive blades being alternately inclined in opposite directions to engage said bottom walls, whereby relative movement of each blade along the associated inclined bottom wall simultaneously adjusts the positions of said cutting edges to permit maintaining the original cutter profile after grinding said cutting edges, and means clamping each blade in the associated slot with the front face of the blade engaging the front wall of the slot, comprising a wedge member in said recess at the rear side of the blade and having a flat front face engaging the rear face of said cutter blade, said wedge member being of a thickness greater than the depth of the recess to space the blade forwardly of the rear face of the slot and provided with a rear transversely curved surface seated in the recess for limited rocking movement of the wedge therein and limited rocking movement of the blade in the slot, and means securing said wedge in said recess in clamping engagement with the blade in the slot to clamp this blade against the front wall of the slot.

5. A slotting cutter comprising a rotary body portion having a plurality of cutter slots formed in the periphery thereof, each having a front wall to engage the front face of a cutter blade, an inclined bottom wall to engage the lower edge of a cutter blade, and a rear wall formed with a transversely curved recess, the said bottom walls of successive slots being alternately inclined in opposite directions, a cutter blade in each slot having axial and radial cutting edges and having a front face engaging the front wall of said slot, an inclined lower edge engaging said bottom wall to support said blade with said cutting edges in determinate position, the said lower edges of successive blades being alternately inclined in opposite directions to engage said bottom walls, whereby relative movement of each blade along the associated inclined bottom wall simultaneously adjusts the positions of said cutting edges to permit maintaining the original cutter profile after grinding said cutting edges, means clamping each blade in the associated slot with the front face of the blade engaging the front wall of the slot, comprising a wedge member in said recess at the rear side of the blade and having a flat front face engaging the rear face of said cutter blade, said wedge member being of a thickness greater than the depth of the recess to space the blade forwardly of the rear face of the slot and provided with a rear transversely curved surface seated in the recess for limited rocking movement of the wedge therein and limited rocking movement of the blade in the slot, and means securing said wedge in said recess in clamping engagement with the blade in the slot to clamp this blade against the front wall of the slot.

References Cited in the file of this patent

UNITED STATES PATENTS

| Number | Name | Date |
|---|---|---|
| 2,306,798 | Benninghoff | Dec. 29, 1942 |

FOREIGN PATENTS

| Number | Country | Date |
|---|---|---|
| 142,896 | Great Britain | May 10, 1920 |
| 475,624 | Great Britain | Nov. 23, 1937 |
| 489,631 | Great Britain | July 29, 1938 |
| 513,333 | Great Britain | Oct. 10, 1939 |